(12) United States Patent
Thran (10) Patent No.: US 9,903,964 B2
(45) Date of Patent: Feb. 27, 2018

(54) METHOD TO CALIBRATE A PHOTON DETECTOR, ABSORPTION FILTER ASSEMBLY AND IMAGING APPARATUS

(71) Applicant: KONINKLIJKE PHILIPS N.V., Eindhoven (NL)

(72) Inventor: Axel Thran, Hamburg (DE)

(73) Assignee: KONINKLIKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/302,511

(22) PCT Filed: Apr. 21, 2015

(86) PCT No.: PCT/EP2015/058537
§ 371 (c)(1),
(2) Date: Oct. 7, 2016

(87) PCT Pub. No.: WO2015/165765
PCT Pub. Date: Nov. 5, 2015

(65) Prior Publication Data
US 2017/0045632 A1   Feb. 16, 2017

(30) Foreign Application Priority Data

May 2, 2014   (EP) ..................... 14166820

(51) Int. Cl.
*G01T 7/00*   (2006.01)
*G01T 1/24*   (2006.01)

(52) U.S. Cl.
CPC .............. *G01T 7/005* (2013.01); *G01T 1/244* (2013.01)

(58) Field of Classification Search
CPC ......... A61B 6/032; A61B 6/582; G01T 7/005; G01T 1/244
See application file for complete search history.

(56) References Cited

U.S. PATENT DOCUMENTS

| | | | | |
|---|---|---|---|---|
| 4,181,858 | A * | 1/1980 | Moore | A61B 6/032 378/157 |
| 5,148,455 | A * | 9/1992 | Stein | A61B 6/405 378/207 |
| 5,687,210 | A | 11/1997 | Maitrejean | |
| 7,010,082 | B2 * | 3/2006 | Hein | A61B 6/583 378/18 |
| 7,125,166 | B2 * | 10/2006 | Eck | A61B 6/583 378/117 |
| 9,198,633 | B2 * | 12/2015 | Freeman | A61B 6/032 |
| 2004/0228451 | A1 | 11/2004 | Wu | |
| 2005/0089146 | A1* | 4/2005 | Toth | A61B 6/032 378/158 |
| 2010/0308229 | A1 | 12/2010 | Bertram | |

(Continued)

OTHER PUBLICATIONS

Alvarez, et al., "Estimator for photon counting energy selective x-ray imaging with multibin pulse height analysis", Medical Physics, vol. 38, No. 5, Apr. 25, 2011.

*Primary Examiner* — Marcus Taningco (57) ABSTRACT

The present invention discloses a method to calibrate a photon counting detector (3). An absorption filter (7) is moved transversely through a photon beam (8) emitted towards the detector (3) to average out the effect of inhomogeneties of the absorption filter (7). The invention also relates to an absorption filter assembly and an imaging device (1) comprising such an absorption filter assembly.

18 Claims, 6 Drawing Sheets

(56) References Cited

U.S. PATENT DOCUMENTS

| | | |
|---|---|---|
| 2011/0012014 A1 | 1/2011 | Livne |
| 2011/0064190 A1 | 3/2011 | Ruimi |
| 2012/0155617 A1 | 6/2012 | Dutta |
| 2016/0128665 A1* | 5/2016 | Roessl .................... G21K 1/10 378/36 |

* cited by examiner

METHOD TO CALIBRATE A PHOTON DETECTOR, ABSORPTION FILTER ASSEMBLY AND IMAGING APPARATUS

CROSS REFERENCE TO RELATED APPLICATIONS

This application is the U.S. National Phase application under 35 U.S.C. §371 of International Application No. PCT/EP2015/058537, filed Apr. 21, 2015, published as WO 2015/165765 on Nov. 5, 2015, which claims the benefit of European Patent Application Number 14166820.2 filed May 2, 2014. These applications are hereby incorporated by reference herein.

FIELD OF THE INVENTION

The present invention generally relates to a method to calibrate a photon detector, an absorption filter assembly for calibration of a photon detector comprising an absorption filter and translation means for translating the absorption filter through a beam of photons and an imaging apparatus.

BACKGROUND OF THE INVENTION

A photon detector detects photons, such as an x-ray beam, that are transmitted from a source to a detector. While this invention is primarily explained using computed tomography (CT) detectors as an example, the invention is also directed to other detectors for medical imaging devices using photon detection, such as other medical imaging devices, for example positron emission tomography device, single-photon emission computed tomography, security scanning devices, optical imaging devices, such as digital cameras; radiographic imaging devices and astronomical devices.

In object scanning apparatuses, such as medical and security imaging apparatuses an object to be scanned, e.g. a patient or luggage, is positioned in an examination region between the photon source and the detector. In other photon detection apparatuses, such as cameras or astronomical apparatuses, a (mostly) unobstructed photon beam may be detected. A detector usually comprises detector pixels and a very precise characterization of each individual pixel is required to evaluate the scanning data and generate high quality images. A response function of each detector pixel is determined to characterize the behavior of the detector pixel by describing the probability distribution of photon pulse heights detected by the pixel. For photon counting detectors, the response function describes the probability distribution of pulse heights for each energy of incoming photons detected by the pixel. The response function is determined during a calibration procedure. Radiation spectra employed in this calibration procedure are preferably monochromatic spectra, since then the response function may be measured directly using a threshold scan, i.e., a number of acquisitions where the energy threshold values of the detectors are varied from acquisition to acquisition. However, monochromatic sources (such as synchrotron radiation or gamma-sources) are not suitable for a calibration of imaging apparatuses with photon counting detectors. Therefore, one has to realize the calibration using the photon source in place. In order to shape a continuous photon (e.g. x-ray) spectrum from the source it has to be filtered with absorber materials with high atomic numbers having absorption edges (K-edges) at relevant energies. For example, a data acquisition with a nearly monochromatic spectrum can be approximated by performing two measurements with k-edge filters having slightly different K-edge energies and calculating the differences of both individual measurements.

For optimal calibration specific materials, such as rare earth metals or elements with high atomic numbers, have to be used, for example the K-edge energies of rare earth metals span the important energy range from 39 to 63 keV. A drawback is that it is very difficult to produce homogeneous samples of these metals or other elements with higher atomic numbers. Since a high image quality can only be achieved if the calibration steps lead to very precise results, small inhomogeneties of the mass thicknesses of K-edge filters, either due to thickness variations, holes or inclusions, will lead to differences in the calibration data of neighboring pixels. These differences may lead to image artifacts.

It would therefore be beneficial to overcome the above stated disadvantageous dependence on high homogeneity of K-edge filters for photon counting detector calibration.

US20110012014 relates to detecting radiation that traverses a material having a known spectral characteristic with a radiation sensitive detectr pixel that outputs a signal indicative of the detected radiation and then determining a mapping between the output signal and the spectral characteristic. It does not provide any way of dealing with the above stated disadvantageous dependence on high homogeneity of K-edge filters for photon counting detector calibration Robert E. Alvarez (MEDICAL PHYSICS, AIP, MELVILLE, N.Y., US, vol. 38, no. 5, pages 2324-2334, published Apr. 25, 2011) disclose a CT calibration phantom with different dimensions configured so that the gantry can make measurements of different projections of the phantom.

SUMMARY OF THE INVENTION

Embodiments according to the present invention are directed to a method to calibrate a photon detector; the method comprising the steps of placing an absorption filter between a photon source and the photon counting detector; emitting a beam of photons from the source towards the photon counting detector through the absorption filter; moving the absorption filter transversely through the emitted beam of photons; and detecting the filtered beam of photons with the photon counting detector.

Such a calibration method results in calibrated detector pixels that are less dependent on the homogeneity of the used absorption filter.

Another embodiment of the present invention is directed towards an absorption filter assembly for calibration of a photon detector, comprising an absorption filter and translation means for translating the absorption filter through a beam of photons, wherein the absorption filter comprises an absorption material with a K-edge that corresponds with an energy of the photons in the photon beam.

Such an absorption filter assembly has the advantage that it does not require as high a homogeneity as required for known absorption filters and can therefore manufactured at lower costs and operated with more reliable results in a detector pixel calibration method.

A further embodiment of the present invention is directed towards an imaging apparatus comprising a photon counting detector arranged to detect photons emitted from a photon source, said photon counting detector comprising detector pixels; and an absorption filter assembly according to the present invention arranged between the photon source and the photon counting detector.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not according to scale.

DETAILED DESCRIPTION OF EMBODIMENTS

The present invention finds particular use in medical imaging devices and is explained using computed tomography, but the invention is also applicable to other imaging systems in which a (pixilated) radiation detector is calibrated using absorption filters, such as particularly x-ray imaging, but also positron emission tomography, single-photon emission computed tomography, optical imaging, radiographic imaging etc. and combinations thereof.

Figure 1:
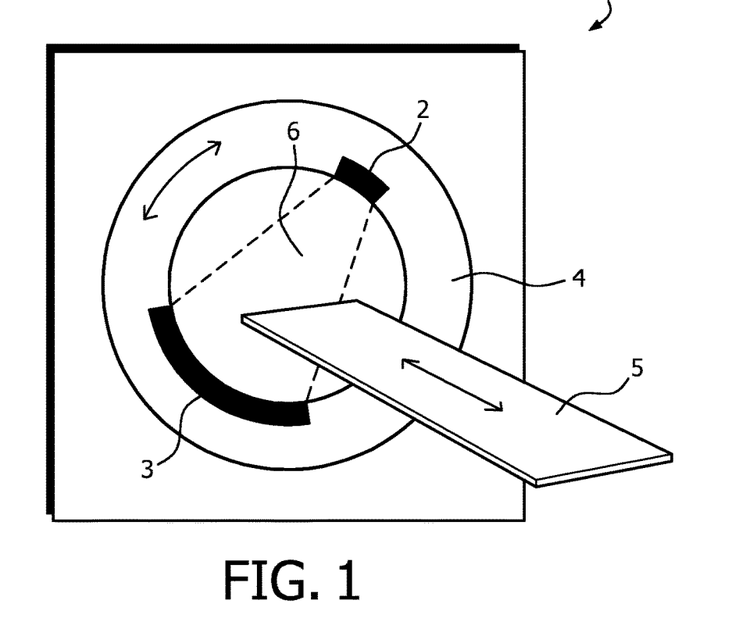
FIG. 1 shows a schematic depiction of a computed tomography apparatus.

FIG. 1 shows a schematic depiction of a computed tomography device 1. A photon counting detector 3 and a photon source 2, in this embodiment an x-ray source, are mounted on a rotatable gantry 4. A subject to be scanned, such as a patient, is positioned on movable support 5, which during scanning moves through examination region 6, while gantry 4 rotates around the examination area and x-ray source 2 emits x-ray radiation. The x-ray radiation which passes through the subject is detected by photon counting detector 3, in which the detected x-ray radiation is converted to electronic information that is further processed in further processing equipment (not shown) to visual information which is displayed to a user, such as a physician.

Figure 2:
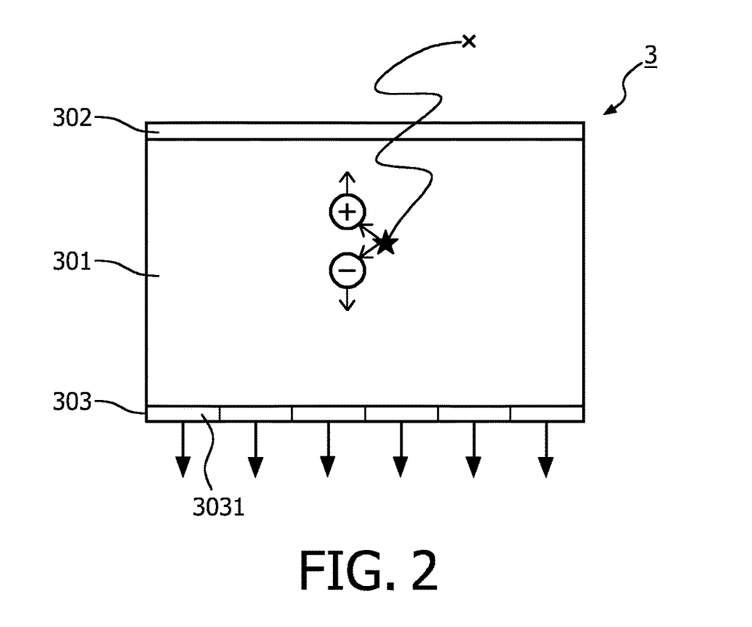
FIG. 2 shows a schematic depiction of an embodiment of a photon counting detector suitable for use in the present invention.

FIG. 2 shows a highly schematic depiction of an embodiment of a photon counting detector 3, namely a direct conversion photon counting detector, in cross section. A bulk of the direct photon conversion photon counting detector 3 is formed by direct conversion material layer 301. The direct conversion material layer 301 may be composed of a single-crystal semiconductor material, which is an intrinsic material or has a fully depleted p-i-n structure. $Cd_xZn_{1-x}Te$ (Cadmium Zinc Telluride, commonly abbreviated to CZT) is an example of a suitable semiconductor material. The direct conversion layer 301 is placed between detector cathode 302 and detector anode 303. The detector cathode is held at a negative bias potential, while the detector anode is held at a less repelling (usually an attracting positive) potential. The detector cathode 302 forms a continuous layer on the direct conversion material layer 301 and is generally transparent to photons with an energy level that are to be detected by the direct conversion photon counting detector. The detector anode 303 is on the opposite side of the direct conversion layer 301 and is made up from a grid of detector anode pixels 3031. When a photon x passes the detector cathode 302 and penetrates into the direct conversion material layer 301, the photon interacts with direct conversion material to generate numerous electron-hole pairs. The positively charged holes drift towards the strongly negatively charged detector cathode 302, while the negatively charged electrons drift towards the more positively charged detector anode 303. When the electrons approach detector anode 303, a signal is induced from each detector anode pixel 3031, which, after collection, is indicative of a count of electrons that approached that particular electrode pixel. The generated signal is then further processed by processing units (not shown) and eventually displayed on a display unit (not shown) to a user as written information or as a reconstructed image.

Figure 3:
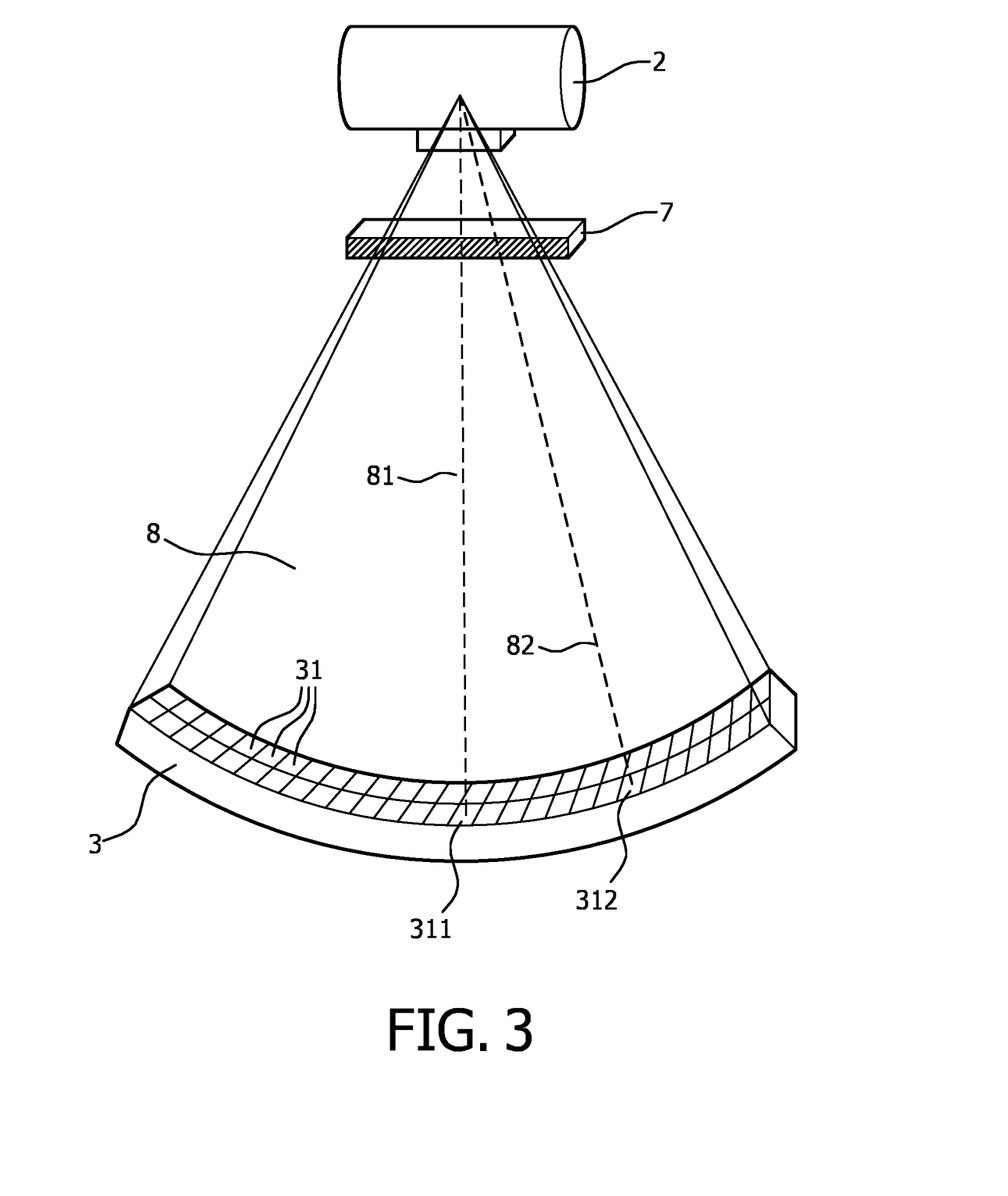
FIG. 3 shows a schematic depiction of an embodiment of an absorption filter according to the present invention placed in a photon beam emitted from a photon source to a photon counting detector.

FIG. 3 schematically shows a cone beam 8 of photons emitted from photon source 2 (in this embodiment an x-ray source) towards photon counting detector 3, comprising detector pixels 31 arranged in rows along the detector 3. A cone beam is the most common beam shape in computed tomography and is easily achieved with known equipment. While this invention is explained using a cone photon beam configuration, a skilled person would know how to adapt elements of the present invention to other possible configurations, such as linear beams, fan beams, stereo beams and others known to the skilled person. During calibration an absorption filter 7 is placed in the cone beam 8. Preferably the absorption filter 7 is present closer to the photon source 3 than to the photon counting detector 2, since the diameter of the beam is smaller at that position than if it were closer to the detector and the filter can therefore be limited in size, which reduces manufacturing costs and accuracy of the filter and equipment connected to the filter.

Absorption filter 7 is used during calibration of the photon counting detector 3. More specifically, the absorption filter is used to determine a response function for each individual detector pixel in a specific energy range. For instance, photons following beam path 81 are detected by detector pixel 311 and photons following beam path 82 are detected by detector pixel 312. When no absorption filter 7 is present, photons with a wide energy range all contribute to a photon count for each detector pixel 31. Each individual detector pixel 31 may differ slightly in its responsiveness to incoming photons and photons emitted from the source 2 may have a variation in energy or frequency depending on an emission angle. Therefore, the photon count may vary slightly depending on the position on the detector 3. During calibration the response function for each individual detector pixel 31 is determined. When a subject, such as a patient, is placed in the examination region 6 and scanned, the response function is taken into account in reconstruction of the photon count data into a scan image.

Absorption filter 7 preferably allows photons in a defined energy range to pass the filter, e.g. between 30 and 140 keV, or smaller ranges such as between 30 and 70 keV or the important energy range between 39 and 63 keV, while photons outside this energy range are largely blocked and will contribute only to a small extend to the number of events detected by detector pixels 31. Filters made of elements with low attenuation above the K-edge energy are optimal. Therefore, a response function for this narrow energy range can then be determined for each detector pixel 31. This may be done for multiple wavelength regions using sequentially one or more further absorption filters 7', 7", 7"' with different energy ranges. Knowing the response function for one or more narrow energy ranges further improves the reliability and accuracy of image reconstruction based on the photon count data.

The response function for each individual detector pixel 31 for the defined energy range is therefore primarily based on absorption and transmission of photons in the absorption layer 7. Therefore, any inhomogeneity 71, 72 in the absorption filter 7 may locally cause a higher or lower photon count in detector pixels, resulting in an incorrect response function for the affected detector pixels 31. The calibration is therefore not correct for these detector pixels 31 and during image reconstruction these variations may even be exaggerated, causing artifacts and other undesired imaging errors.

Figure 4A:
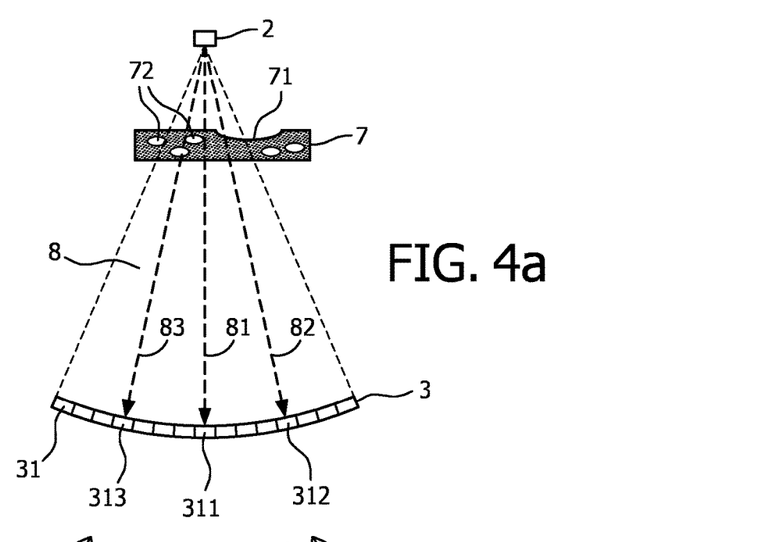
FIGS. 4a, 4b and 4c schematically show various positions of the absorption filter according to the present invention in a photon beam.

For instance, the filter 7 may have a non-flat top or bottom surface, such as for instance a depression or bumps, thereby either decreasing or increasing a beam path length through the absorption filter 7 compared to a flat surface, which would result in a decreased or increased photon count for photons following this beam path. FIG. 4a shows an example, wherein photons travelling along beam path 82 enter the absorption filter 7 at a spot where the top surface has a depression 71, resulting in a shorter beam path length through the absorption filter 7.

Another example of inhomogeneities in the absorption filter that may influence the photon count is also shown in FIG. 4a. Local inclusions 72 within the absorption filter itself are present. These inclusions 72 may be voids, particles of other materials or local density variations. These inclusions may influence the photon count by causing photons to have fewer encounters with the absorption filter material, unwanted reflection or absorption of photons with an energy that should have been let through absorption filter 7. An example of this is shown in FIG. 4a, wherein photons travelling along beam path 83 encounter two inclusions 72 in the absorption filter 7.

The present invention overcomes this problem by providing the absorption filter 7 such that it is part of an absorption filter assembly comprising said absorption filter 7 and translation means (not shown) for translating the absorption filter through the photon beam. The translation means may take any form or shape, as long as they are arranged to move the absorption filter 7 through the photon beam 8, for instance an assembly of a motor and connecting means to connect the motor to the absorption filter.

The movement of the absorption filter is transverse compared to the photon beam, e.g. perpendicular to a normal corresponding with beam path 81 of FIG. 4a. By moving the absorption filter through the beam during the calibration the photons detected over a time period by detector pixels 31 will have encountered an average mass thickness of the filter in the penetrated region rather than the mass thickness at one particular location of the absorption filter 7 Also, the effect of the inhomogeneities is also averaged out over time and multiple detector pixels 31 and will have a reduced effect on the photon count. Acquisition times for each filter and detector setting are in the order of one second, so any technical requirements to achieve a sufficiently fast movement of the filter are very low. As such, the required level of extraordinary high homogeneity necessary for static absorption filters can be much lower, resulting in lower manufacturing costs.

Figure 4B:
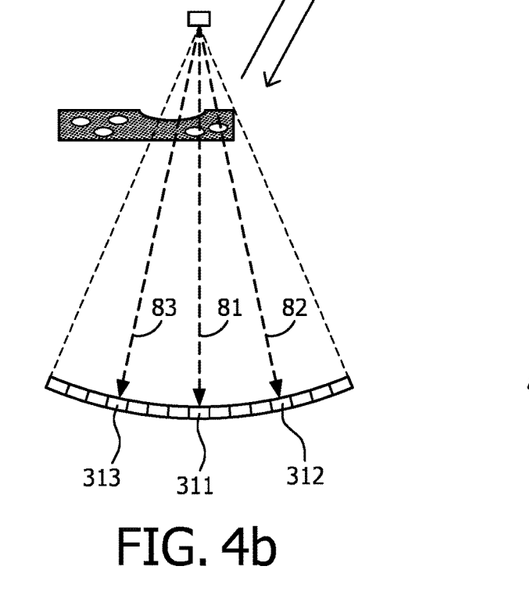
Figure 4C:
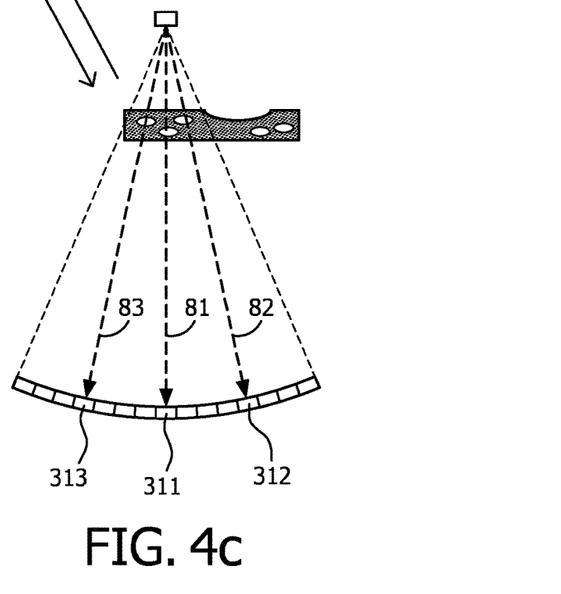

FIGS. 4b and 4c show two extreme positions of the absorption filter 7 in the beam 8, while FIG. 4a shows the absorption filter 7 in an, approximately, center position. The absorption filter 7 may move one or more times between the positions of 4b and 4c to achieve the advantages of the present application. Also, if different sections of the absorption filter 7 are moved out of the beam, as is for instance the case in FIGS. 4b and c, then a lifetime of the absorption filter 7 may be increased, since degradation due to photon absorption, e.g. heat formation or molecular degradation, will be reduced, thereby reducing the cost over time for each absorption filter. The filter is shown in FIGS. 4b and 4c in extreme positions to most clearly illustrate the present invention. In a practical set-up the filter would probably not extend this far outside the beam, since in these positions it is moved so far from the center position that the radiation for the outer detector pixels is only partially filtered, which must be avoided in a practical situation.

Figure 5A:
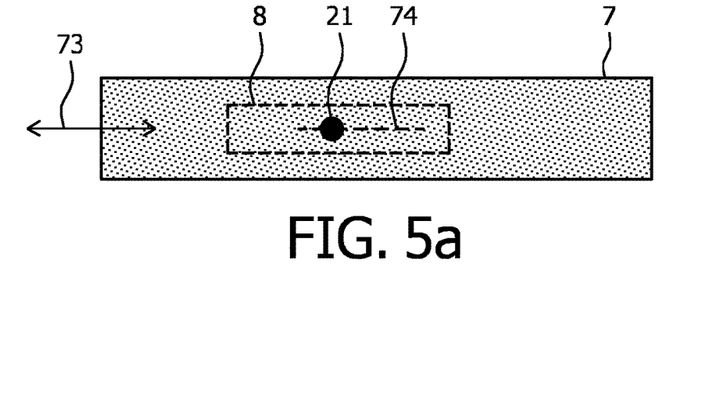
FIGS. 5a, 5b, and 5c show three different embodiments of the absorption filter according to the present invention and examples of how to move said absorption filter through a photon beam according to the present invention.
Figure 5B:
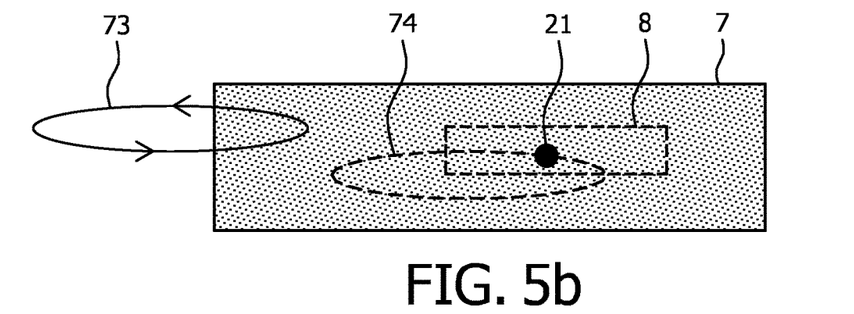
Figure 5C:
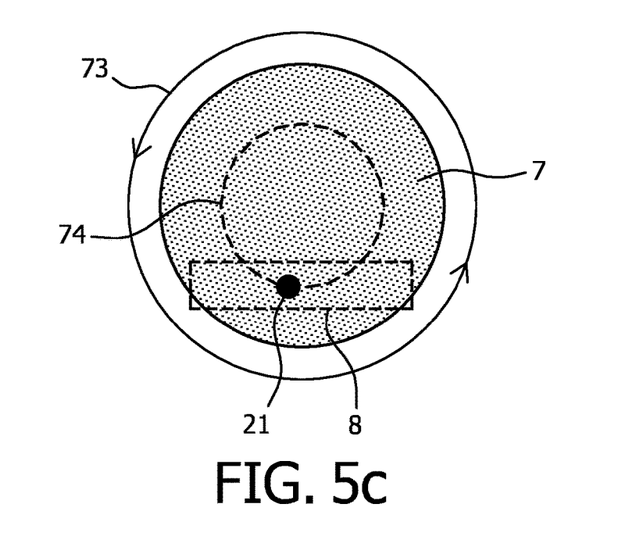

The absorption filter 7 may have various shapes and may be moved along various trajectories through the photon beam 8. FIG. 5 depicts some embodiments, but many more possibilities would become clear to the skilled person that applies the present invention.

In FIG. 5a a rectangular absorption filter 7 is translated linearly along trajectory 73 back and forth through photon cone beam 8. The dotted line 8 represents the boundaries of the photon beam 8 at the height of the filter, wherein the height is defined as the distance of the filter from the photon counting detector. Black dot 21 is a projection of the focal spot of the photon source 2 towards the midpoint of the detector. Dashed line 74 represents the positions of the filter surface penetrated by x-rays, which hit the middle of the detector. Therefore the middle detector pixel will measure, on average, x-ray intensities filtered with a mass density equal to the average mass density of the filter at these shapes.

In FIG. 5b a rectangular absorption filter 7 is moved through the photon beam 8 along an elliptical trajectory 73. In this configuration averaging of the filter occurs in two dimensions, thereby further decreasing the chance of negative effects due to inhomogeneities. A skilled person would recognize that a similar effect could also be achieved with other non-linear trajectories, such as circular, rectangular, sinusoidal, zig-zag trajectories and the like.

In FIG. 5c the absorption filter 7 has a circular shape and rotates along trajectory 73 through photon beam 8. An advantage of this embodiment is that it is simple to realize, but it would require a much larger filter area than for instance a rectangular absorption filter 7 such as the one shown in FIG. 5a or 5b. Also, this circular configuration is much harder to realize if several filter materials or filter thicknesses have to be integrated in one setup in order to acquire calibration measurements for each of the integrated filters separately.

Figure 6:
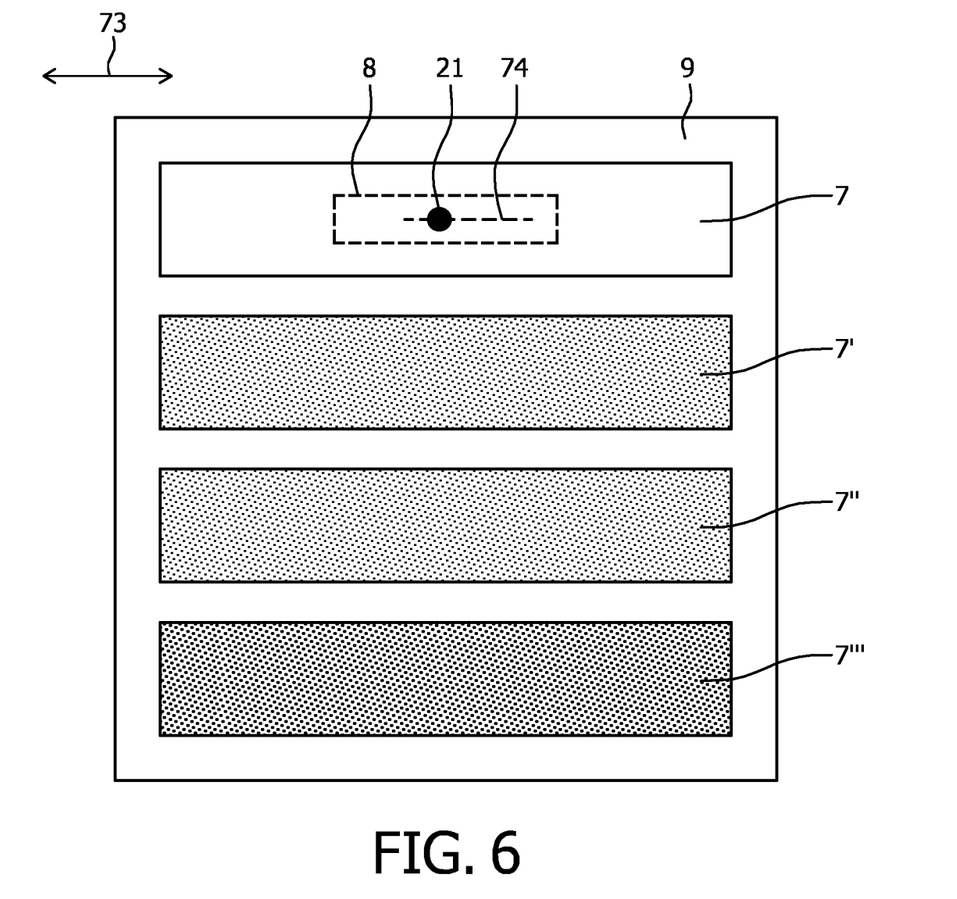
FIG. 6 shows a schematic depiction of a holder for a plurality of absorption filters according to the present invention.

An example of an integrated setup with several absorption filter elements 7, 7', 7", 7"' is shown in FIG. 6. In this embodiment four absorption filter elements 7, 7', 7", 7"', each absorbing different photon energy ranges are mounted in an absorption filter holder 9 that is translated linearly as a whole along trajectory 73. A skilled person would recognize that many other trajections, holder configurations or respective positions in the holder, more or less absorption filters (including a single filter) are possible that would fall under the scope of the present invention.

The absorption filter 7 may be arranged to move through the photon beam 8 by providing connection means to connect the absorption filter 7 to a motor. Preferably the connection means are provided to the absorption filter holder, thereby not overly complicating absorption filter manufacturing and simplifying a setup with multiple absorption filter elements and allowing easy replacement of absorption filter elements.

Figure 7:
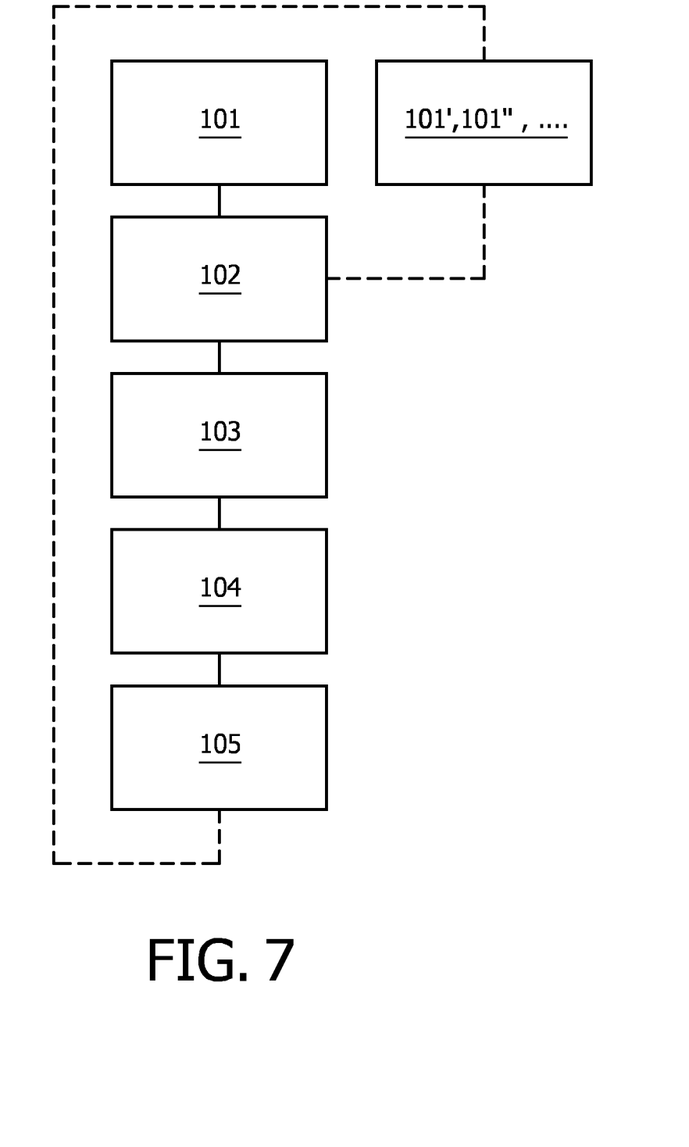
FIG. 7 shows a schematic flow diagram for a method to calibrate a photon detector according to the present invention.

FIG. 7 depicts a flow chart for a method to calibrate a photon detector according to the present invention. In these steps and during the whole calibration procedure the gantry usually does not rotate. In step 101 an absorption filter 7 is placed between the photon source 2 and the photon counting detector 3, wherein the absorption filter comprises at least an absorber material, typically with a K-edge that corresponds with an energy of photons emitted from the photon source. In step 102 a beam of photons 8 is emitted from the source 2 towards the photon counting detector 3 through the absorption filter. In case of medical or security imaging this usually means that a photon source is switched on. In case of, for instance, photon detectors such as cameras or astronomical devices the photon source may already be emitting photons, but this step may be interpreted as allowing the photons to reach the detector (e.g. by placing it in a specific location, opening a shutter or directing the beam towards the detector). Step 102 covers both these situations. In step 103 the absorption filter is moved transversely through the emitted beam of photons 8. Simultaneously, in step 104, the filtered beam of photons 8 is detected by the photon counting detector 3. In step 105 photon detection characteristics, such as a response function, are determined for each detector pixel 31 of the photon counting detector 3. The method may also be done sequentially 101', 101", . . . with further absorption filters replacing the previous absorption filter after the response function for each detector pixel 31 is determined.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

Any reference signs in the claims should not be construed as limiting the scope.

The invention claimed is:
1. A method to calibrate a photon counting detector, comprising:
  placing an absorption filter between a photon source and the photon counting detector;
  emitting a beam of photons from the source towards the photon counting detector through the absorption filter;
  moving the absorption filter transversely through the emitted beam of photons during a calibration scan; and
  detecting the filtered beam of photons with the photon counting detector over an averaged mass thickness of the absorption filter moved transversely during the calibration scan.

2. The method according to claim 1, wherein the photon counting detector comprises detector pixels, and further comprising:
  characterizing pixel photon detection properties for each detector pixel of the photon counting detector over the averaged mass thickness of the absorption filter during the calibration scan.

3. The method according to claim 2, wherein pixel photon detection properties are characterized as a pixel response function.

4. The method according to claim 2, wherein the method is repeated with a further absorption filter with K-edge properties different from the absorption filter replacing the absorption filter after pixel photon detection properties for each detector pixel is determined.

5. The method according to claim 1, wherein the beam of photons is a cone beam.

6. The method according to claim 1, wherein the absorption filter is moved linearly through the beam of photons.

7. The method according to claim 1, wherein the absorption filter is moved rotationally around an axis through the beam of photons.

8. The method according to claim 1, wherein the absorption filter is moved along an elliptical path through the beam of photons.

9. An absorption filter assembly for calibration of a photon detector, comprising:
  an absorption filter comprising a absorption material with a K-edge that corresponds with an energy of photons in a photon beam; and
  a translation means for translating the absorption filter through the photon beam that provides an averaged mass thickness of the absorption filter moved transversely during a calibration scan.

10. The absorption filter assembly according to claim 9 configured to be moved along various transverse trajectories through the photon beam.

11. The absorption filter assembly according to claim 9, further comprising:
  an absorption filter holder for holding at least one absorption filter.

12. The absorption filter assembly according to claim 9, wherein the absorption material comprises a high atomic number material and/or a rare earth metal.

13. The absorption filter assembly according to claim 9, wherein the absorption material absorbs in an energy range between 30 and 140 keV.

14. The absorption filter assembly according to claim 9, wherein the absorption material absorbs in an energy range between 30 and 70 keV.

15. The absorption filter assembly according to claim 9, wherein the absorption material absorbs in an energy range between 39 and 63 keV.

16. An imaging apparatus, comprising:
  a photon counting detector arranged to detect photons emitted from a photon source; and
  an absorption filter assembly according to claim 10, arranged between the photon source and the photon counting detector.

17. The imaging apparatus according to claim 16, wherein the photon counting detector comprises detector pixels, and the imaging apparatus further comprises a pixel photon detection properties determiner for determining pixel photon detector properties for each individual detector pixel.

18. The imaging apparatus according to claim 16, wherein each individual detector pixel includes a response function determiner for determining a response function for the corresponding individual detector pixel.

* * * * *